April 28, 1964  R. H. CANADAY ETAL  3,131,350
TEST APPARATUS FOR MEASURING TRACKING ERROR BETWEEN
A SYNCHRO TRANSMITTER AND RECEIVER
Filed Oct. 21, 1955
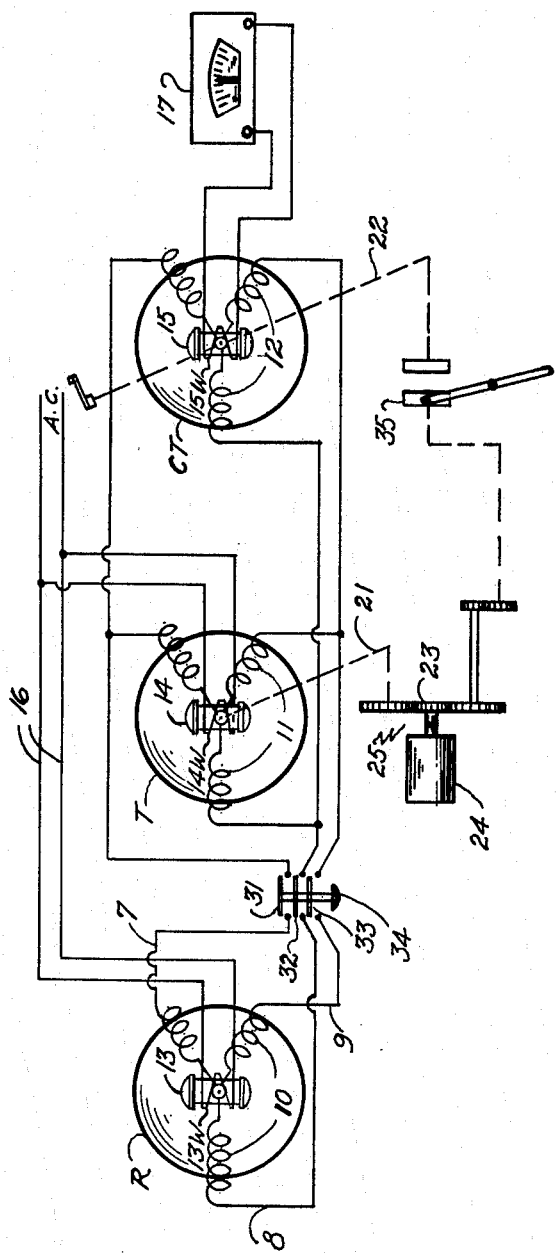
INVENTORS
Roscoe H. Canaday and Adrian E. Glandon
BY
ATTORNEY

3,131,350
TEST APPARATUS FOR MEASURING TRACKING ERROR BETWEEN A SYNCHRO TRANSMITTER AND RECEIVER
Roscoe H. Canaday and Adrian E. Glandon, Rochester, N.Y., assignors, by mesne assignments, to the United States of America as represented by the Secretary of the Air Force
Filed Oct. 21, 1955, Ser. No. 542,114
3 Claims. (Cl. 324—158)

This invention relates to electrical indicating systems, and particularly to systems employing electrically interconnected synchronous rotors for reproducing angular displacement, in "tracking" fashion.

In the manufacture and use of remote indicating devices utilizing synchro generators and motors as "master" and "slave" units, respectively, it is frequently desirable to measure the tracking error, that is, the angle, if any, by which the slave (current-receiving) rotor lags or leads the rotor of the master (current-transmitting) unit. The present invention provides a novel electrical method and means for measuring this tracking error, the said measuring method being reducible to practice by use of a third synchronous unit having its rotor physically linked to the rotor of the synchro-generator, and its stator electrically connected in parallel with the stator windings of both the synchro-generator and the synchro-motor (or motors), the said third unit thus being conditioned to generate, in its rotor windings, a voltage that will be directly proportioned to the amount of lag or lead prevailing as between the transmitting and receiving rotors, and that will at the same time indicate, by its polarity, whether the deviation error is in the lagging or leading direction.

The indicated system has, as one of its advantages, the attainment of an error indication by the use of only one additional synchronous unit, and without resorting to specially wound machines or differentially rotated devices such as have been common heretofore in error indicating or correcting systems.

These and other characteristics and advantages of the invention will become apparent upon reference to the following detailed description of the embodiment of the invention illustrated in the accompanying drawing.

In the drawing the three electrically interconnected units R, T, and CT are, respectively, a synchronous motor, a synchronous generator, and a control transformer, with all three units having Y-connected stator windings 10, 11, and 12 conforming to a single pattern, and identical inductor type rotors 13, 14, and 15 whose windings, in the cases of units R and T, are connected to a source 16 of alternating current of, for example, 400-cycle frequency. Winding of rotor 15 has its terminals connected to the terminals of a vacuum tube voltmeter 17 of conventional design, whose index element may move across a suitable scale, in either direction from a zero point, to register the polarity and magnitude of the voltage developed across the winding of rotor 15, which polarity and magnitude may be represented on the scale of the meter 17 in terms of lagging or leading angular motion (radians or degrees).

Shafts 21 and 22 extend from rotors 14 and 15, respectively, and are mechanically connected, as indicated by link 23, for unitary rotation at identical speeds, the common driving means therefor being indicated as including a prime mover 24, and a speed-reducing gear train 25 connecting motor 24 to the transmission link 23 that is the common drive-coupling means for both rotor shafts 21 and 22.

Quick-detachable switch connections 31, 32 and 33 (having a common actuator 34) are provided in the lines inter-connecting units R and T, to facilitate initial setting of the rotor of control transformer CT in the angular position wherein voltage development across rotor windings 15w is of approximately zero value—the rotor position of "null" magnetic relationship to the stator field. Also, to facilitate such initial setting the drive to rotor 15 is provided with a manually operable clutch or coupling 35 so that the rotor 15 may be manually turned independently of rotor 14 during the process of initially adjusting the rotor 15 to the null position, as above noted.

The procedure for testing the tracking accuracy of a given repeater or receiving unit, such as the unit R, is as follows:

With the switch connections 31, 32, and 33 interrupted, the clutch 35 disengaged, and the prime mover 24 deenergized, the rotor shaft 22 is manually rotated until the meter 17 shows a zero or near-zero reading. During this manual rotation step, some current will flow in the stator windings of units T and CT, in parallel fashion, as a result of the current-generating effect of the manual rotation of rotor 15, except that when rotor 15 arrives at the null, or minimum flux position, current flow will be at a minmum, and the meter reading will be substantially zero. At this point switches 31, 32, and 33 are thrown "on," clutch 35 is re-engaged, and prime mover 24 is energized. The meter 17 will now register a plus or minus voltage whose magnitude will be proportional to the extent of lag or lead, as the case may be, on the part of unit R, with respect to the reference unit T.

The circuit theory may be stated as follows:

When the rotor of a synchro-generator is excited with an A.C. voltage, there is produced in the synchro a flux whose position depends on the rotor position and whose instantaneous magnitude is a function of the rotor-to-stator phase shift. This is also true of a synchro motor, except that the rotor-to-stator phase shift is a different value from that of the generator. If the stator of a generator be connected in parallel with the stator of a motor and the rotors of both are excited with alternating current, the difference between the voltages generated within the two units will cause error currents to flow in the external circuit between the stator windings when the two rotors are not in corresponding angular relationships. These error currents will be of a magnitude proportional to the differences in the internally generated voltages of the two synchros, the proportion being modified somewhat by the relative impedance values of the respective windings. Because of these impedances the stator terminal voltages will not be equal to either of the generated voltages. Rather they will assume intermediate values whose difference will be variable, depending upon the ratio of stator impedances. The flux position corresponding to these stator terminal voltages will be between the generator rotor position and the motor rotor position.

Now, with control transformer CT having its stator connected in parallel with the stators of units T and R, there will be produced in unit CT an internal flux whose direction will assume an angle corresponding to the "mean" of the stator terminal voltages and therefore lying between the generator rotor angle and the motor rotor angle, the exact intermediate position being dependent upon the ratio of generator impedance to the total impedance of the combination.

Since this impedance ratio remains reasonably constant, the control transformer flux angle will differ from the generator rotor angle by a constant fraction of the "error" angle (that is, the angle by which rotor 13 lags or leads rotor 14); hence, with the two rotors 14 and 15 constrained against relative motion, the "error" angle will be converted into an electrical torque, as it were, which electrical torque will cause application of positive or negative voltage to meter 17, where it will be readable as the lagging error angle, or the leading error angle, as the case may be. In addition to the visual display on meter 17, the output voltage of winding 15w may be applied to the stylus of conventional recording apparatus (not shown) to provide a permanent record. Such a recorder drive may or may not include amplification and discrimination or demodulation stages, depending upon the degree of precision required.

When the invention is used to test the performance of a plurality of slave units—as, for example, units having indicators showing azimuth and elevation angles, respectively—each of such units may be connected into the system by wiring to the respective stators, in parallel with the leads 7, 8, and 9, which wiring may include switching means for selectively connecting and disconnecting individual units.

The speed for motor 24, and the reduction ratio for unit 25, may be chosen as desired, depending upon the range of speeds that the units T and R will encounter in the service to which they are to be assigned. In one application of the invention a speed of 0.7 r.p.m. for shafts 21 and 22 was found to be advantageous as a check upon the units T and R under the most difficult conditions for maintaining synchronism.

In lieu of the Y-connections for the stators, delta connections may be substituted. Other changes may be made in the electrical and mechanical structures, procedures, and interrelationships of the component parts, as the invention is not limited to the disclosed details, except insofar as indicated in the appended claims.

What is claimed is:

1. In a motion-reproducing system, a master unit, a slave unit electrically connected thereto, each of said units including stator and rotor components means for applying torque to the rotor of said master unit for reproduction of the resulting motion at said slave unit, a third unit including a rotor component rotatable in response to operation of said torque applying means, means including a manually operable clutch mechanism mechanically linking said torque-applying means with said third unit; an indicator element, and means carried by said third unit for delivering current to said indicator element in one direction or the other, in accordance with the direction of error in the motion reproduction performance of said slave unit.

2. Test apparatus for determining how closely a synchro repeater device follows a synchro transmitter device each of which devices has a stator winding and a rotor winding, said apparatus comprising, in combination, circuit means connecting said transmitter synchro device and said repeater synchro device in a self-synchronous data repeater system, a high impedance pickoff synchro device having a stator winding and a rotor winding, circuit means connecting the stator winding of said pickoff synchro to the stator windings of said transmitter synchro and said repeater synchro in said data repeater system, electrical indicating means connected to the rotor winding of said pickoff synchro, and mechanical coupling means interconnecting the rotors of said transmitter synchro and pickoff synchro at their electrical zero positions.

3. Test apparatus for determining how closely a synchro repeater device follows a synchro transmitter device each of which devices has a stator winding and a rotor winding, said apparatus comprising, in combination, circuit means connecting said transmitter synchro device and said repeater synchro device in a self-synchronous data repeater system, a high impedance pickoff synchro device having a stator winding and a rotor winding, circuit means connecting the stator winding of said pickoff synchro to the stator windings of said transmitter synchro and said repeater synchro in said data repeater system, electrical indicating means connected to the rotor winding of said pickoff synchro, mechanical coupling means rigidly interconnecting the rotors of said transmitter synchro and pickoff synchro at their electrical zero positions, and drive means coupled to the rotors of the said transmitter and pickoff synchros.

References Cited in the file of this patent

UNITED STATES PATENTS

| | | |
|---|---|---|
| 2,388,977 | Johnson | Nov. 13, 1945 |
| 2,405,568 | Ferrill | Aug. 13, 1946 |
| 2,625,599 | Downes | Jan. 13, 1953 |
| 2,772,412 | Weiher | Nov. 27, 1956 |